J. HRIBAR.
CLUTCH.
APPLICATION FILED SEPT. 17, 1914.

1,139,977.

Patented May 18, 1915.

Witnesses
Einar Larson
M. C. Lucas

Inventor
Joe Hribar
By Milo K. Stevens & Co.
Attorneys

UNITED STATES PATENT OFFICE.

JOE HRIBAR, OF WAUKEGAN, ILLINOIS.

CLUTCH.

1,139,977. Specification of Letters Patent. Patented May 18, 1915.

Application filed September 17, 1914. Serial No. 862,199.

*To all whom it may concern:*

Be it known that I, JOE HRIBAR, a subject of the Emperor of Austria-Hungary, residing at Waukegan, in the county of Lake and State of Illinois, have invented certain new and useful Improvements in Clutches, of which the following is a specification.

The device which is the subject matter of the present application for patent is designed more particularly for use in connection with crank handles employed for winding up the spring motor of graphophones and other talking machines, and its object is to provide a simple and efficient device whereby the crank handle is prevented from being turned in a reverse direction. The device may also be used in connection with the roll-winding mechanism of player-pianos, or any other mechanism requiring a device of this kind.

The invention is illustrated in the accompanying drawing, forming a part of this specification, in which—

Figure 1:
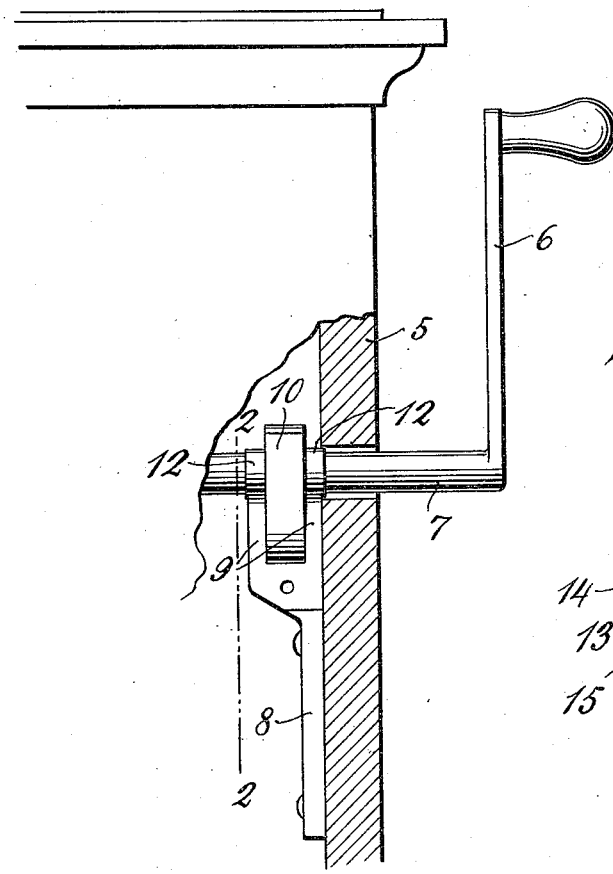
Figure 2:
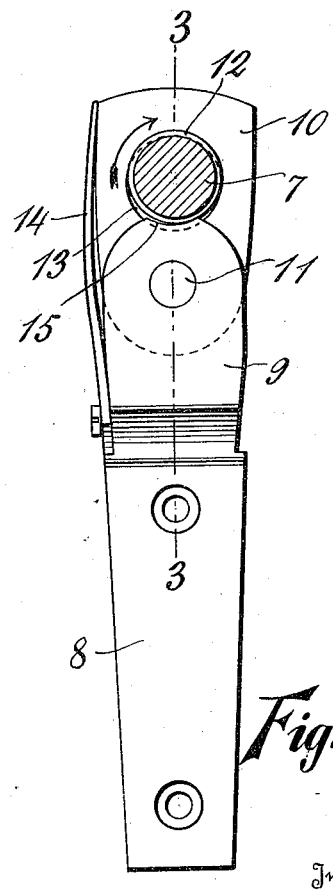
Figure 3:
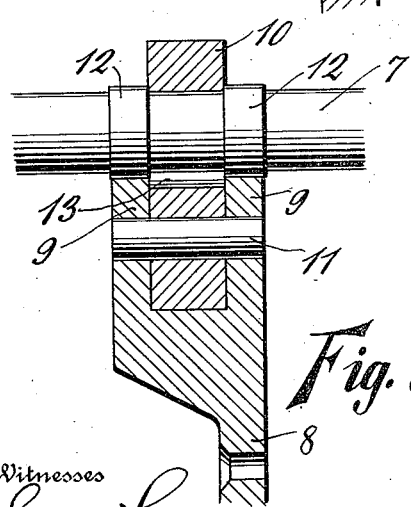

Figure 1 is an elevation of the clutch device; Fig. 2 is an enlarged cross-section on the line 2—2 of Fig. 1, and Fig. 3 is a vertical section on the line 3—3 of Fig. 2.

Referring specifically to the drawing, 5 denotes the casing of a talking machine in which is mounted the spring motor which rotates the turn table carrying the record disk. As the spring motor forms no part of the present invention, it has not been illustrated. The motor spring is wound up by a crank handle 6 on a shaft 7. This winding shaft passes through an opening in the wall of the casing 5, and the crank handle is located on the outside of the latter. On the inner face of the casing wall is mounted a supporting bracket 8 for the clutch device. This bracket is bifurcated at one end, and between the branches 9 thereof is pivotally mounted a clutch member 10 by means of a pin 11 passing through said parts. The shaft 7 has spaced collars 12, which are in contact with the top edges of the parts 9. That portion of the shaft 7 which is between the collars 12 passes through an aperture 13 in the member 10, said aperture being large enough to allow the collars to pass therethrough. The bracket 8 carries a flat spring 14 which presses against one side of the member 10.

The top edges of the parts 9 on which the collars 12 seat are rounded and have a small depression 15 which forms a cam surface against which the collars bear. The spring 14 swings the member 10 slightly to one side so that one end only of the wall of the depression is normally in contact with the collars. Now, if it is attempted to turn the shaft in the direction of the arrow in Fig. 2, the frictional engagement of the shaft with the curved wall of the depression tends to swing the member 10 in a direction to bring said wall toward the shaft, whereupon a binding action takes place between said wall and the shaft, and the latter is prevented from being rotated in this direction. The shaft is however free to be turned in the opposite direction, as the member 10 then swings in a direction to carry the clutching surface away from the shaft. The movement of the member in this direction is opposed by the spring 14, and hence, when the shaft is released, the member swings back to locking position. The swing of the member is very slight, it being just enough to grip or to release the shaft. The collars 12 prevent endwise movement of the shaft 7.

The clutching action may be reversed by mounting the spring 14 on the side opposite the one on which it is shown mounted in the drawing. This reversal of the spring reverses the position of the member 10 and the clutching surface of the depression 15. If no spring is employed the shaft 7 is locked against turning in either direction, and by holding the member 10 in release position, the shaft is free to turn in either direction. Thus four distinct actions may be obtained.

The reversing feature is important where a shaft must turn in one direction to a certain limit and then reverse. The device prevents reversal of the shaft before the proper time. A spring 14 may be provided for both sides of the clutch member, one or the other of said springs being placed in operative position according to the direction the shaft is to be left free to turn.

The device is in small and compact form and its parts are few and simple, yet a tight grip on the shaft is obtained. The position of the member 10 between the fork branches 9 prevents displacement of said member.

I claim:

1. The combination with a shaft, of means for locking the same against rotation in one direction, said means comprising a stationary and a movable member, through one of which members the shaft passes, the other member having a cam surface which is in frictional contact with the shaft.

2. The combination with a shaft, of means for locking the same against rotation in one direction, said means comprising a stationary and a movable member, through one of which members the shaft passes, the other member having a cam surface which is in frictional contact with the shaft, and resilient means forcing the movable member in a direction to establish such frictional contact.

3. The combination with a shaft, of means for locking the same against rotation in one direction, said means comprising a stationary member having a cam surface, a pivoted member through which the shaft passes, and resilient means forcing the pivoted member in a direction to establish frictional contact between the shaft and the cam surface.

4. The combination with a shaft, of means for locking the same against rotation in one direction, said means comprising a stationary member having branches, the outer ends of which have depressions forming cam surfaces, a member pivoted between said branches and having an aperture through which the shaft passes, and resilient means forcing said member in a direction to establish frictional contact between the shaft and the aforesaid cam surfaces.

5. The combination with a shaft, of means for locking the same against rotation in one direction, said means comprising a stationary and a movable member, through one of which members the shaft passes, the other member having a cam surface which is in frictional contact with the shaft, and reversible resilient means forcing the movable member in a direction to establish such frictional contact.

In testimony whereof I affix my signature in presence of two witnesses.

JOE HRIBAR.

Witnesses:
 MARTIN C. DECKER,
 ETHEL M. GARTLEY.

Copies of this patent may be obtained for five cents each, by addressing the "Commissioner of Patents, Washington, D. C."